United States Patent Office.

BENJAMIN C. TILGHMAN, OF PHILADELPHIA, PENNSYLVANIA.

Letters Patent No. 92,229, dated July 6, 1869.

IMPROVED PROCESS OF TREATING VEGETABLE SUBSTANCES TO OBTAIN FIBRE.

The Schedule referred to in these Letters Patent and making part of the same.

*To all whom it may concern:*

Be it known that I, BENJAMIN C. TILGHMAN, of Philadelphia, Pennsylvania, have invented new and useful Improvements in Treating Vegetable Substances for the preparation of fibres for spinning, paper-pulp, and cellulose; and I hereby declare the following to be a full description thereof.

I have found that the dissolving action of a solution of sulphurous acid in water upon the intercellular or incrusting matter of plants, takes place at temperatures below two hundred and twelve degrees, Fahrenheit, (212° Fahr.,) in open vessels, at pressures not exceeding that of the atmosphere.

Under these conditions, water retains only a small quantity of sulphurous-acid gas, and the dissolving action is much slower than when higher temperatures and stronger solutions of the acid are employed in close vessels, under a pressure superior to that of the atmosphere.

Nevertheless, this mode of operating is advantageous, when it is wished to carry the action to a partial extent only, as in the treatment of long-fibred plants for the preparation of fibres for spinning, where it is important to avoid too much disaggregation and weakening of the fibres; and also in cases where cheapness and simplicity of apparatus are more important than rapid working.

My invention consists in a process of treating flax, hemp, esparto, and other grasses, straw, wood, and other vegetable substances which contain fibres, with a solution of sulphurous acid in water, heated, under a pressure not exceeding that of the atmosphere, to a temperature sufficient to cause it to dissolve, either partially or wholly, as may be desired, the intercellular or cementing-matter existing between the fibres, so as to leave the vegetable substance in a condition suitable for the preparation of fibres for spinning, or of paper-pulp, or of cellulose, or for other purposes, according to the nature of the material employed.

I have found that the addition of sulphite or bisulphite of lime, or other suitable base to the acid solution, tends to make the fibrous product of a whiter color and more easily bleached, and also helps to retain the acid gas in the solution when heated.

The following is a method of carrying my invention into effect, taking, for example, the treatment of flax to obtain fibres for spinning:

A wooden tub, of any convenient size and shape, is lined with lead, and provided with a close-fitting movable cover, and with a close steam-coil of lead pipe. This tub is nearly filled with the flax-plants, and with a solution of sulphurous acid in water, of about specific gravity of 1.005 to 1.01, to which has been added as much sulphite of lime as it will hold dissolved at the temperature employed. The plants are arranged in open order, so as to allow of free circulation of the liquid, and are to be kept below its surface.

Heat is then applied by means of the close steam-coil until sulphurous-acid gas begins to be evolved, which ordinarily takes place at about one hundred and eighty to two hundred degrees, Fahrenheit, (180 to 200° Fahr.;) and the heat is maintained at about this point, or a little below it, until the samples, which are taken out frequently, show that the fibres are sufficiently loosened, and separable from the stem of the plant and from each other.

Generally from twelve to eighteen hours are enough, but the samples are the only reliable guide, as too long a digestion weakens the fibres, and too short a treatment leaves them difficult to clean and separate. Plants which have been fully matured, so as to ripen the seeds, require longer treatment than those which have been pulled at an earlier stage of growth.

The acid solution is then run off, and the plants are washed with water until all acid and soluble matters are removed. They are then dried, and the fibres are separated from the woody part of the plant in the usual manner.

A subsequent boiling of the fibre in soap-water is advantageous. By repeated treatments alternately with hot, weak alkaline or soap solutions, and with sulphurous-acid solutions, the separation of the fibres can be carried to any desired extent, but there is always a risk of weakening them.

The cover of the tub is provided with a lead pipe, which conducts to a suitable condenser any sulphurous-acid gas which may be evolved during the digestion.

Any sulphurous acid in the waste liquors can be saved either by boiling and condensation, or by precipitation with lime, so as to form sulphite of lime.

Hemp, jute, China-grass, and other long-fibred plants, whether in the state of rough fibre, or preferably as entire plants, are to be treated in a similar manner, the duration of the digestion being varied to suit the material.

Esparto-grass, straw, and similar substances, may be operated upon in this manner to prepare paper-pulp, the acid solution being changed or renewed from time to time, and the digestion continued until the intercellular matter is dissolved, and the fibrous portion is found to be sufficiently soft and pulpy.

Wood requires a much longer time than annual plants.

A solution of sulphurous acid alone, without sulphite of lime, acts more rapidly, but the product is generally more colored.

In place of the sulphites, other salts of equivalent chemical properties, as explained in the specification of my patent of November 5, 1867, No. 70,485, may be employed.

The action of the acid solution is gradual and progressive. Its first effect on straw, grasses, osiers, young woods, &c., is to make them more flexible, and more suitable for making hats, mats, baskets, hoops, &c. After a longer treatment, the substance can be reduced by mechanical means to coarse fibres, suitable for *papier-maché*, pasteboard, &c.; and by continuing the action till the intercellular matter is completely dissolved out, the substance can be reduced to very fine fibres, suitable for paper-pulp.

The following is a convenient method of operating in a continuous manner upon wood or other vegetable substance:

A vertical wooden trunk, or cylinder of any convenient size, lined with lead, is filled with chipped wood, which is kept wet by water dripping from the top.

A current of steam and sulphurous-acid gas is thrown in near the bottom of the trunk, and is condensed and absorbed so as to keep the pores of the wood filled with a hot solution of sulphurous acid, which is constantly being changed and renewed, and to maintain the temperture a few degrees below 212° Fahrenheit.

The excess of the acid gas passes off from the top of the trunk, by a lead pipe, into a suitable condenser.

The top of the trunk is kept closed, and is provided with a hopper with double slides, for introducing fresh charges of wood.

The acid liquid, after it has passed through the wood, is collected in a lead-lined receiver at the bottom of the trunk, and is thence run off, from time to time, into a lead-lined tub, where it is boiled, and its acid gas again driven into the trunk.

When the bottom portion of the wood is found to be sufficiently decomposed, it is to be taken out by a side-door, and a fresh charge of wood is put in on top.

The disintegrated wood is to be washed and ground to pulp in the ordinary manner.

If any sulphite of lime is used, it should be mixed, in the state of powder, with the wood before it is put into the trunk.

I do not confine myself to the kind of apparatus, length of time, degree of heat, or strength of acid solution above described, as my invention can be carried into effect in any convenient way by which vegetable fibrous substances can be digested with a solution of sulphurous acid in water, heated, under pressure not exceeding that of the atmosphere, to a temperature sufficient to cause it to dissolve the intercellular or incrusting matter of the plants.

What I claim as my invention, and desire to secure by Letters Patent, is—

The process of treating vegetable substances which contain fibres, with a solution of sulphurous acid in water, either with or without the addition of sulphites, heated, under a pressure not exceeding that of the atmosphere, to a temperature sufficient to cause it to dissolve the intercellular or incrusting matter of said vegetable substances, so as to leave the undissolved portion in a fibrous state applicable to the manufacture of fibres for spinning, or of paper-pulp, or of cellulose, or to other purposes, according to the nature of the material employed.

Also, the use and application of sulphites, or other salts, of equivalent chemical properties, as above described, in combination with a solution of sulphurous acid in water, as an agent in treating vegetable substances which contain fibres, when heated therewith, at a pressure not exceeding that of the atmosphere, to a temperature sufficient to cause said acid solution to dissolve the intercellular or cementing-matter of said vegetable substances.

B. C. TILGHMAN.

Witnesses:
R. A. TILGHMAN,
JOHN WHITE.